(12) United States Patent  
Klahold et al.

(10) Patent No.: US 7,726,741 B2
(45) Date of Patent: Jun. 1, 2010

(54) LONGITUDINAL ADJUSTER FOR A VEHICLE SEAT

(75) Inventors: Wolfgang Klahold, Herne (DE); Gerhard Mitulla, Bochum (DE)

(73) Assignee: KEIPER GmbH & Co. KG, Kaiserlautern (DE)

( * ) Notice: Subject to any disclaimer, the term of this patent is extended or adjusted under 35 U.S.C. 154(b) by 633 days.

(21) Appl. No.: 11/286,455

(22) Filed: Nov. 23, 2005

(65) Prior Publication Data

US 2006/0113829 A1    Jun. 1, 2006

(30) Foreign Application Priority Data

Dec. 1, 2004   (DE) ................. 10 2004 057 901
Sep. 20, 2005  (DE) ................. 10 2005 044 778

(51) Int. Cl.
    A47C 1/00   (2006.01)
    B60N 2/20   (2006.01)

(52) U.S. Cl. ..................................... 297/341

(58) Field of Classification Search ............ 297/341, 297/378.12; 248/429, 430
See application file for complete search history.

(56) References Cited

U.S. PATENT DOCUMENTS

| | | |
|---|---|---|
| 4,547,718 A | 10/1985 | Ratzel et al. |
| 4,844,542 A | 7/1989 | Humer |
| 5,348,373 A | 9/1994 | Stiennon |
| 5,597,206 A | 1/1997 | Ainsworth et al. |
| 5,605,377 A | 2/1997 | Tame |
| 5,717,300 A | 2/1998 | Baloche et al. |
| 5,873,629 A | 2/1999 | Schuler |
| 5,944,383 A | 8/1999 | Mathey et al. |
| 6,048,030 A | 4/2000 | Kanda et al. |
| 6,098,946 A | 8/2000 | Sechet et al. |

(Continued)

FOREIGN PATENT DOCUMENTS

DE        42 01 829 A2    6/1993

(Continued)

OTHER PUBLICATIONS

U.S. Appl. No. 11/809,069, filed May 31, 2007; In re: Wolfgang Klahold et al., entitled *Longitudinal Adjuster for a Vehicle Seat*.

*Primary Examiner*—David Dunn
*Assistant Examiner*—James Alex
(74) *Attorney, Agent, or Firm*—Womble Carlyle Sandridge & Rice, PLLC

(57) ABSTRACT

In a longitudinal adjuster (3) for a vehicle seat having a backrest that can pivot freely, a first seat rail (13), and a second seat rail (15) relative to which the first seat rail (13) can be displaced longitudinally, a locking device (16) for locking the longitudinal adjuster (3), a memory device assigned to the first seat rail (13) and interacting with the second seat rail (15), said memory device memorizing a set longitudinal seat position which is relinquished when the vehicle seat (1) is longitudinally displaced during the free pivoting of the backrest (5) and is then re-assumed once the seat is displaced back again, and an actuation device (101) assigned to the first seat rail (13), which actuation device actuates the resetting of the memory device and the unlocking of the locking device (16), the actuation device (101) is arranged with limited movement capability in the longitudinal direction relative to the first seat rail (13).

26 Claims, 4 Drawing Sheets

U.S. PATENT DOCUMENTS

| | | |
|---|---|---|
| 6,102,478 A | 8/2000 | Christopher |
| 6,336,679 B1 * | 1/2002 | Smuk .................... 297/378.12 |
| 6,619,741 B1 * | 9/2003 | Tame ........................ 297/341 |
| 6,629,730 B2 * | 10/2003 | Makosa ..................... 297/341 |
| 6,631,952 B1 | 10/2003 | Liebetrau et al. |
| 6,799,800 B2 | 10/2004 | Klahold et al. |
| 6,926,364 B2 * | 8/2005 | Cooley et al. .......... 297/378.12 |
| 2004/0164599 A1 * | 8/2004 | Klahold et al. .............. 297/341 |

FOREIGN PATENT DOCUMENTS

| | | |
|---|---|---|
| DE | 195 09 344 A1 | 9/1996 |
| DE | 102 06 303 A1 | 8/2003 |
| EP | 1 334 866 B1 | 8/2003 |
| WO | WO 03/062012 | 7/2003 |

* cited by examiner

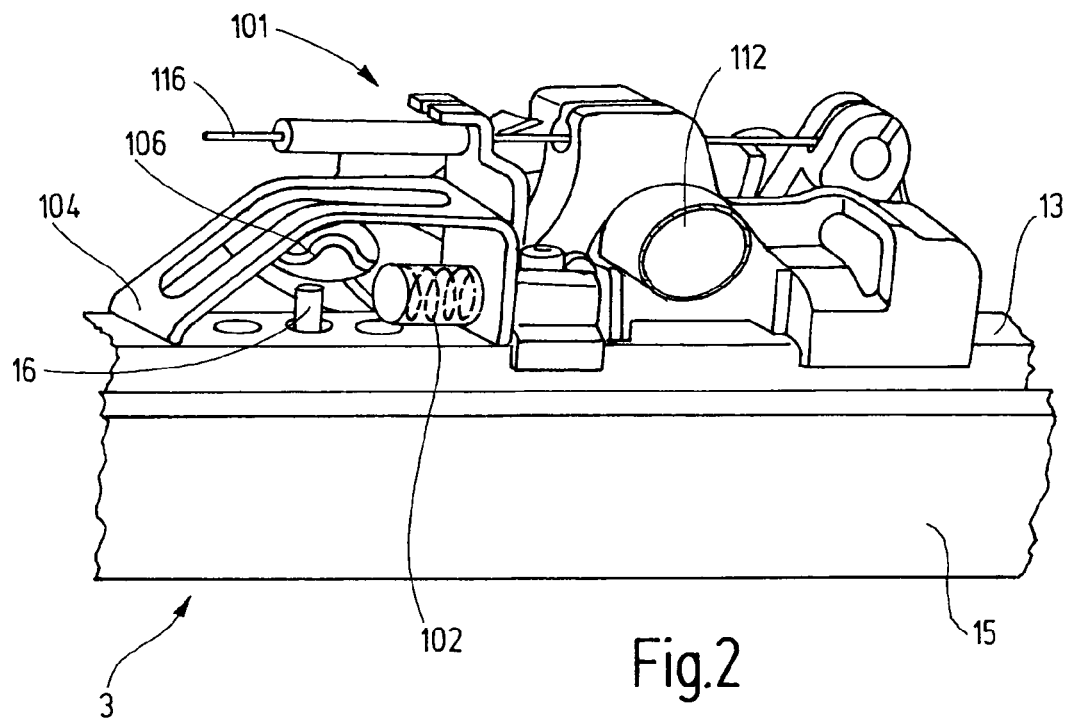
Fig.2
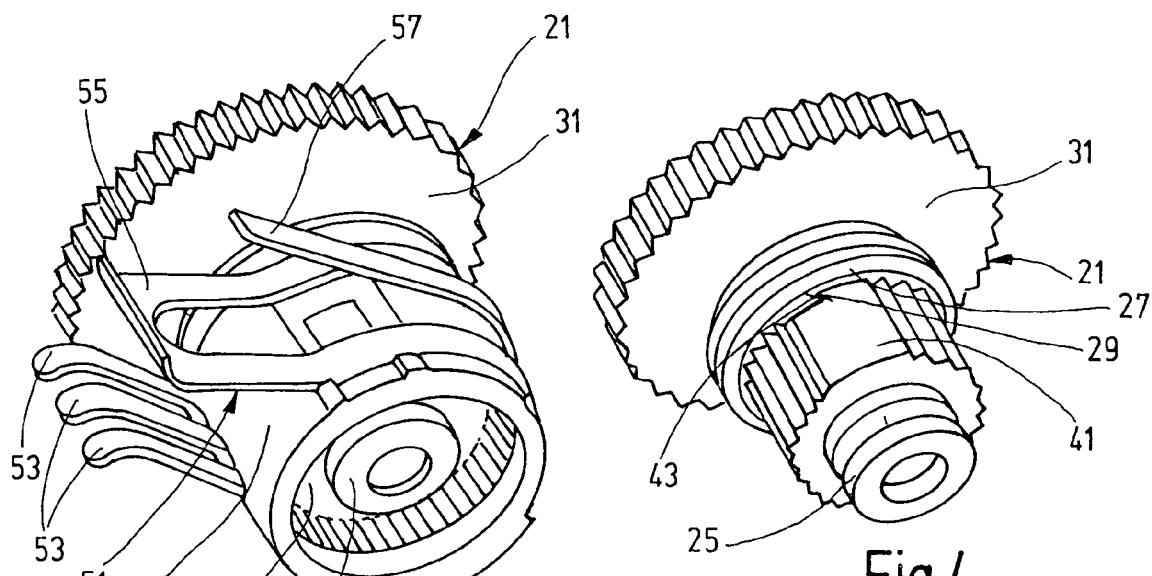
Fig.3
Fig.4
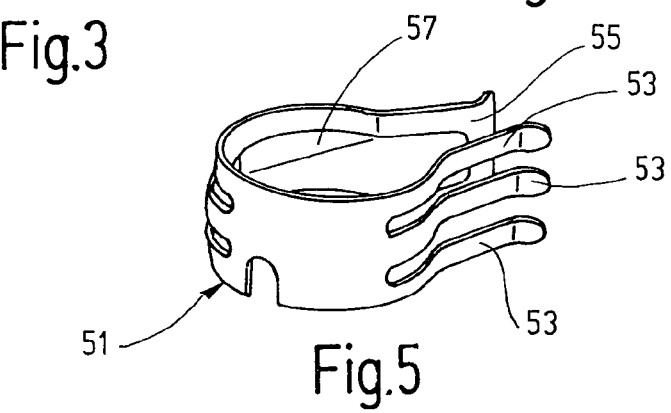
Fig.5

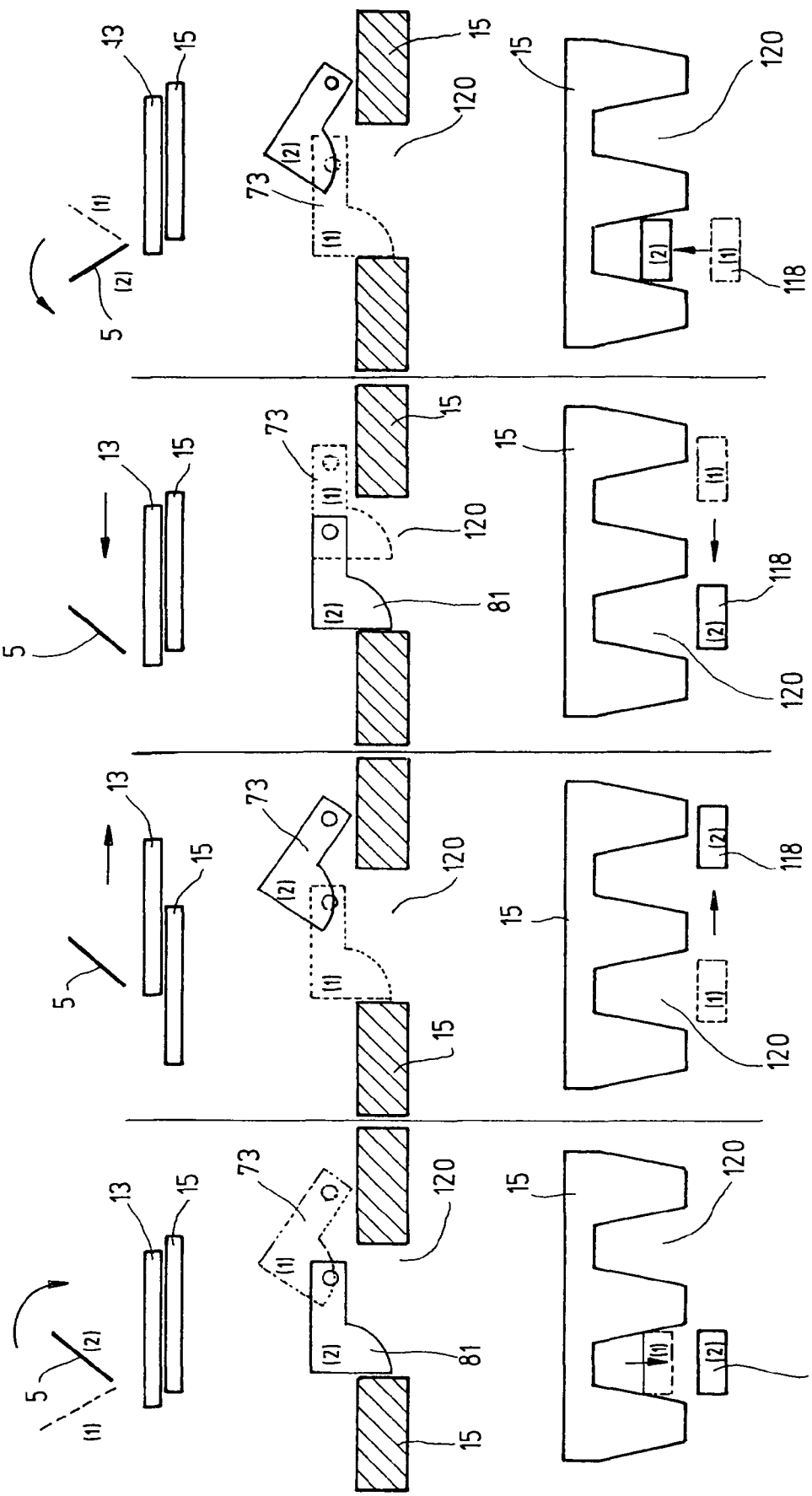

LONGITUDINAL ADJUSTER FOR A VEHICLE SEAT

RELATED APPLICATIONS

The present application claims priority to both DE 10 2004 057 901.6, which was filed Dec. 1, 2004, and DE 10 2005 044 778.3, which was filed Sep. 20, 2005. The entire disclosure of each of DE 10 2004 057 901.6, which was filed Dec. 1, 2004, and DE 10 2005 044 778.3, which was filed Sep. 20, 2005, is incorporated herein by reference.

BACKGROUND OF THE INVENTION

The present invention generally relates to a longitudinal adjuster for a vehicle seat having a backrest that can pivot freely, with the longitudinal adjuster including a first seat rail and a second seat rail relative to which the first seat rail can be displaced in the longitudinal direction; a locking device for locking the longitudinal adjuster; a memory device assigned to the first seat rail and interacting with the second seat rail, with the memory device storing a set longitudinal seat position, which is departed from when the vehicle seat is longitudinally displaced during the free pivoting of the backrest and is then re-assumed once the seat is displaced back again; and an actuation device assigned to the first seat rail, which actuation device actuates resetting by the memory device and unlocking by the locking device.

WO 03/062012 A1 and U.S. Pat. No. 6,799,800 disclose a longitudinal adjuster of the type described immediately above. The memory device is connected through the upper side of the first seat rail with an actuation device that is mounted on the first seat rail and that actuates the memory device for resetting. The control spring is mounted on the control signal generator. A longitudinal rib of the control signal generator running parallel to the axis of rotation of the displacement measuring device, and a corresponding recess in the control spring act as a floating bearing and ensure a rotationally rigid connection, with the possibility of sliding along the axis of rotation of the displacement measuring device. Due to the special shape and high demands for dimensional accuracy, the production of these components is expensive. When the memorized longitudinal seat position has been reached, the actuated locking element pivots out and engages in the second seat rail. A small relative movement of the seat rails is required for detaching and pivoting back.

BRIEF SUMMARY OF SOME ASPECTS OF THE PRESENT INVENTION

An aspect of the present invention is the provision of improvements to a longitudinal adjuster of the type mentioned immediately above. In accordance with one aspect of the present invention, in a longitudinal adjuster for a vehicle seat having a backrest that can pivot freely (e.g., that can be pivoted in a predetermined manner), the longitudinal adjuster includes a first seat rail and a second seat rail relative to which the first seat rail can be displaced in the longitudinal direction; a locking device for locking the longitudinal adjuster; a memory device assigned to the first seat rail and interacting with the second seat rail, with the memory device storing a set longitudinal seat position (e.g., a remembered longitudinal position), which is departed from when the vehicle seat is longitudinally displaced during the free pivoting of the backrest and is then re-assumed once the seat is displaced back again (e.g., the first seat rail can be longitudinally moved back to the remembered longitudinal position after the first seat rail has been longitudinally moved out of the remembered longitudinal position); and an actuation device assigned to the first seat rail, which actuation device actuates resetting by the memory device and unlocking by the locking device, wherein the actuation device is arranged with limited movement capability in the longitudinal direction relative to the first seat rail.

By virtue of the fact that the actuation device is arranged with limited movement capability (e.g., is capable of moving, but to a limited extent) in the longitudinal direction relative to the first seat rail, especially at the start and at the end of the free pivoting of the backrest (e.g., in response to predetermined pivoting of the backrest), the actuation device, together with the interfaces to the memory device and to the locking device and—when the memory device is preferably linked with the actuation device—also the memory device itself, can be moved relative to the first seat rail. It is thus possible, for example, for a locking element that is in locking contact with the second seat rail to detach from the second seat rail.

When the longitudinal adjuster is directly triggered, the actuation device resets the memory device so that a new longitudinal seat position may be memorized. In contrast, when the backrest is pivoted freely (e.g., when the backrest is pivoted in a predetermined manner), the memory device is uncoupled without being reset, so that the adjusted longitudinal seat position remains memorized and can be found again. The actuation device can be mounted above the memory device on the first seat rail, i.e. in the immediate vicinity of the memory device, thereby simplifying access to the control area and the resetting of the memory device. In this way, the actuation device can also at the same time be a part of the unlocking system of the longitudinal adjuster by virtue of the fact that it supports, for example, components being necessary for this purpose. During the free pivoting of the backrest, the actuation device can then preferably actuate the locking device in order to unlock it.

The actuation device is supported on the first seat rail, preferably by means of a spring that not only provides the path for movement of the actuation device, for example out of a starting position, but also provides the restoring force for returning to that starting position. The initial force to move the actuation device is applied to the actuation device preferably by means of a cable line, with the initial force preferably being applied by the backrest when pivoting freely, as a tensile force in the Bowden cable.

In the memory device used according to the invention, a measuring area, a load area and a control area are separated from each other as much as possible, so that the forces required for the locking effect between the seat rails, i.e. the forces needed for stopping the movement of the first seat rail, are not taken up by the means for sensing displacement in a measuring area but rather by a separate, actuated locking element in a load area, so that components made of plastic which can be manufactured cost effectively can be used for the control area and the measuring area, while components made of metal are used for the load area. The control area does not need to be completely integrated into the measuring area but instead can be somewhat separated from it, which increases the versatility of the actuation possibilities.

The locking elements in the load area of the memory device have to be distinguished from the intrinsic locking of the longitudinal adjuster, which is carried out by a separate locking device which is designed to withstand crash forces. This separate locking device, which is designed to withstand crash forces, unlocks when the longitudinal adjuster is directly triggered, and locks the longitudinal adjuster again in the newly set longitudinal seat position. This locking device is in principle independent of the memory device, but normally it is indirectly coupled via the triggering of the longitudinal adjuster. For example, there may be a coupling for resetting the memory device.

By arranging a control bearing between the control signal generator and the control spring, which bearing guides the control signal generator and supports the control spring, the bearing and guiding functions are separated from each other. This permits simplified support of the control spring and also the geometrically simplified manufacture of same. The quality of the guidance between the control signal generator and the control bearing is independent of the position of the control signal generator during its movement. When the control bearing is made of plastic, the associated manufacturing costs are of no relevance given the advantages obtained.

The control bearing preferably surrounds the control signal generator, for example by designing the control bearing as a bushing, i.e. it is arranged radially on the outside of the control signal generator. The control bearing guides the control signal generator preferably linearly along the axis of rotation of the displacement measuring device, i.e. axially, preferably by the control signal generator being mounted in the control bearing by means of a toothing, for example splining, in a rotationally rigid manner and axially, i.e. perpendicular to the profile of the toothing, movable relative to the control bearing. The control signal generator in turn runs preferably as a spindle nut on a spindle of the displacement measuring device, along the axis of rotation of same (axially), so that the relative movement between the distance measuring device and the control signal generator takes place in a very small space and that an exact storage of the travel path, covered starting from the memorized longitudinal seat position, is possible. The axial length of the control bearing is matched to the axial portion of the path covered by the control signal generator to the maximum.

The control bearing supports the control spring in a defined manner, preferably by means of depressions and/or elevations which, in the preferred arrangement, are provided on the outside of the control bearing, and the dimensions and shapes of which are matched to the control spring. The control spring preferably surrounds the control bearing almost completely, which ensures a secure fit and concentrates the existing pretensioning of the control spring on the projecting parts of the control spring. In this case, the control spring comprises preferably at least one control tongue which projects with its short (short in relation to the overall length) free end away from the control bearing and thus applies the pretensioning with a short lever arm.

The invention is preferably used for vehicle seats of two-door motor vehicles with backrest that can pivot freely, but it can also be used with other vehicle seats.

Other aspects and advantages of the present invention will become apparent from the following.

BRIEF DESCRIPTION OF THE DRAWINGS

The present invention is explained in greater detail below with reference to an exemplary embodiment which is illustrated in the drawings, in which:

FIG. 2 is a perspective partial view of the exemplary embodiment, with the direction of travel pointing to the right, FIG. 3 is a perspective view of the displacement measuring device, the control signal generator, the control bearing and the control spring, FIG. 4 is a perspective view of the displacement measuring device and the control signal generator, FIG. 5 is a perspective view of the control spring, FIG. 6 is a schematic illustration of a vehicle seat, FIG. 7 is a schematic illustration of the backrest inclination, the relative position of the seat rails, the positioning lever interacting with the horizontally sectioned second seat rail, and the locking plate interacting with the vertically sectioned second seat rail, in each case at the start of the free pivoting of the backrest and in the remembered position, the position prior to the pivoting of the backrest being designated as (1), and the position with forward-pivoted backrest and retracted actuation device being designated as (2), FIG. 8 is a schematic illustration according to FIG. 7, in each case with the vehicle seat during displacement forward, the position prior to the displacement being designated by (1) and the position in which the vehicle seat has been displaced forward being designated as (2), FIG. 9 is a schematic illustration according to FIG. 7, in each case with the vehicle seat during displacement back, the position prior to the locking of the memory device being designated as (1) and the position with the locking memory device being designated as (2), FIG. 10 is a diagrammatic illustration according to FIG. 7, in each case at the end of the free pivoting of the backrest, the position prior to the backrest pivoting back being designated as (1), and the position with the backrest pivoted back and the actuation device displaced forward being designated as (2)

DETAILED DESCRIPTION OF AN EXEMPLARY EMBODIMENT

Figure 1:
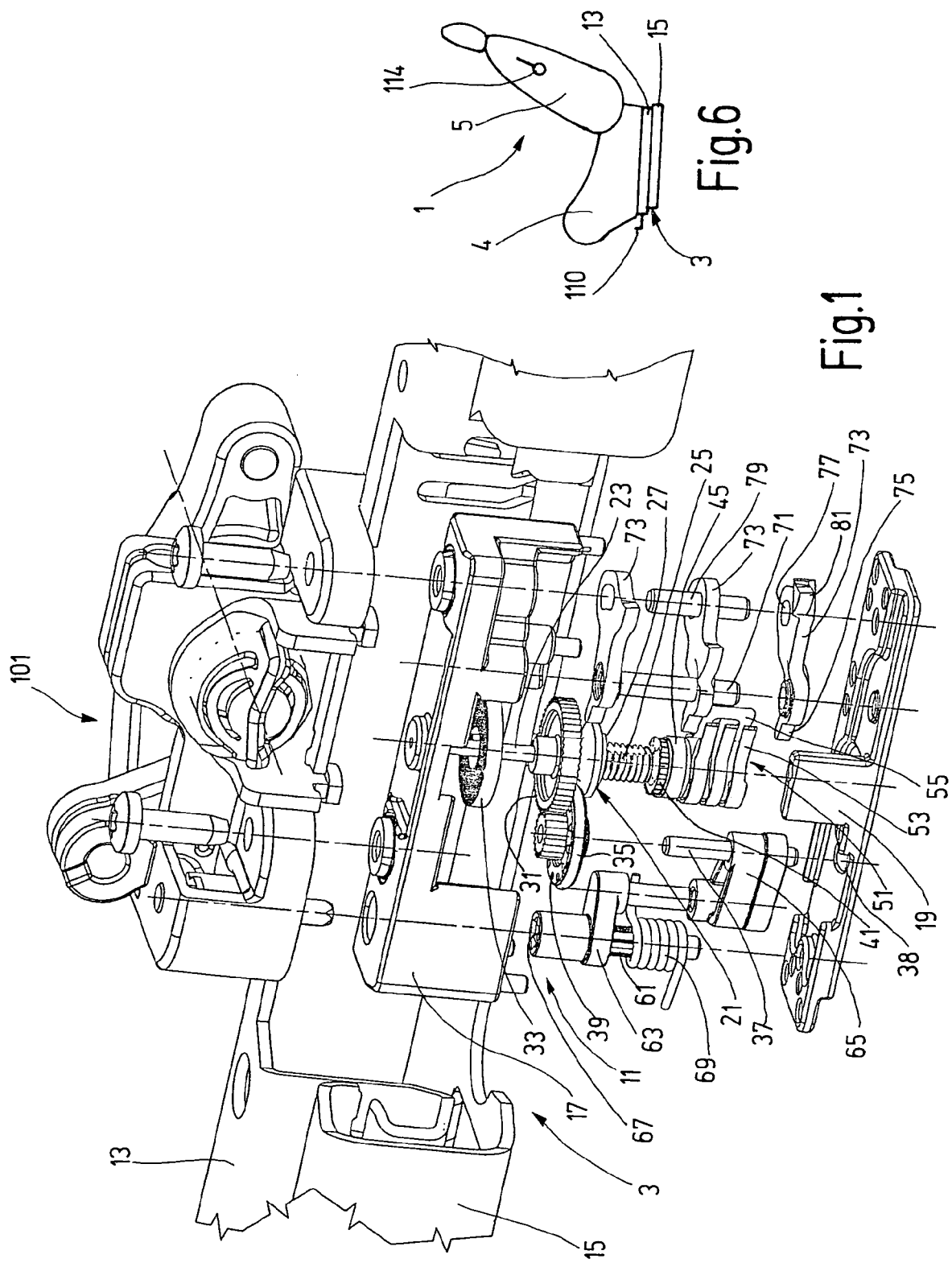
FIG. 1 is an exploded illustration of a part of the exemplary embodiment, with the direction of travel pointing to the left.
Figure 11:
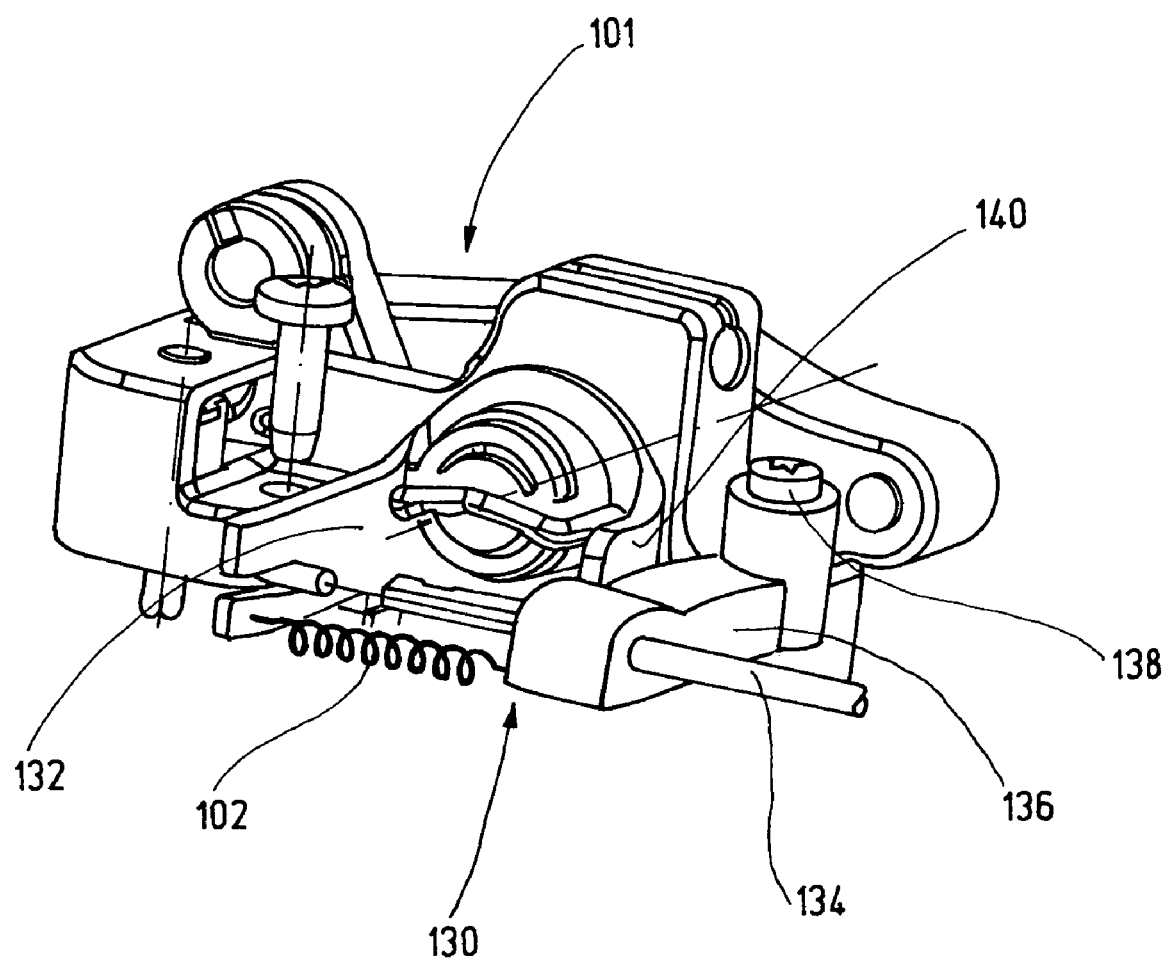
FIG. 11 is a perspective illustration of the actuation device with the release device.

A vehicle seat 1, which is for a two-door motor vehicle, is longitudinally displaceable in its entirety by means of a longitudinal adjuster 3; therefore, the vehicle seat 1 can assume various longitudinal seat positions. The backrest 5 of the vehicle seat 1 is mounted on the seat part 4 so that the backrest's angle of inclination is adjustable and the backrest can be pivoted freely (i.e., the backrest can be pivoted forward in order to permit access to the rear seats). In order to obtain the widest possible access, when the backrest 5 is pivoted freely (e.g., when there has been predetermined pivoting of the backrest), the longitudinal adjuster 3 is unlocked at the same time so that the vehicle seat 1 can be displaced forwards. In order to return to the starting position, the vehicle seat 1 is first displaced back to the previously occupied longitudinal seat position, where it is locked, and then the backrest 5 is pivoted back. A memory device 11 is provided in order to memorize this previously occupied longitudinal seat position.

The structure and method of functioning of the memory device 11 correspond largely to those of the memory device described in WO 03/062012 A1 and U.S. Pat. No. 6,799,800. The entire disclosure of each of WO 03/062012 A1 and U.S. Pat. No. 6,799,800 is incorporated herein by reference. The memory device 11 is arranged within an inner mounting space of a first seat rail 13, which serves as one of two upper rails of the longitudinal adjuster 3. The first seat rail 13, which is fixed to the seat structure, is capable of being displaced in the longitudinal direction of the vehicle seat 1, relative to a second seat rail 15. The second seat rail 15 is fixed to the vehicle structure and serves as one of two lower rails of the longitudinal adjuster 3, and it is capable of being locked by means of a locking device 16. Of this locking device 16, only a bolt projects upwards out of the first seat rail 13 in FIG. 2.

The memory device 11 has a housing 17 which has walls that are largely closed, at least at the top and at the front, but it is open at the bottom and closed off by a screwed-on or riveted cover 19. The one completely open longitudinal side of the two longitudinal sides of the housing 17 is referred to in the following as the outward-facing side, while the opposite longitudinal side is referred to as the inward-facing side. The memory device 11 has a measuring area, a control area and a load area.

In the measuring area, a displacement measuring device 21 is provided. The displacement measuring device 21 is provided with an axis of rotation 23 made of wire defining an axial direction and projecting beyond the axial ends of the displacement measuring device 21. The displacement measuring device 21 is mounted by means of this axis of rotation 23 in the upper wall of the housing 17 or in the cover 19 and is rotatable about said axis of rotation 23. Seen from below, the displacement measuring device 21, which is otherwise constructed in one piece, has a spindle 25 along the axis of rotation 23. The spindle 25 is adjoined by a stop block 27 having an annular recess. In the area of the end side facing downwards to the spindle 25, the stop block 27 comprises a first stop face 29 arranged so that it runs radially outwards and perpendicular to this end side (axially), and the stop face 29 is formed as a shoulder in the circumferential direction.

On the upward-pointing end side of the stop block 27 there is an adjoining large gearwheel 31 which partially overlaps the stop block 27 in the radial direction. In addition, a reset spring 33 of spiral design is mounted on the end of the axis of rotation 23 projecting beyond the large gearwheel 31. The inner end of the reset spring 33 is firmly supported on the bearing axis 23. The outer end of the reset spring 33 is supported on the housing 17. A running wheel 35, which is another component in the measuring area, is rotatably mounted on a bearing axis 37 that is oriented parallel to the axis of rotation 23. The bearing axis 37 is guided at one end in a bearing gate 38 in the cover 19, and at the other end in an identically curved groove in the housing 17. A small gearwheel 39 meshing with the large gearwheel 31 is mounted at or formed on the upper end side of the running wheel 35.

A control signal generator 41 designed as a spindle nut is screwed onto the spindle 25. Depending on the desired orientation of the memory device 11 with respect to the longitudinal direction of the vehicle seat 1, the threads of the spindle 25 and of the control signal generator 41 are either right-handed or left-handed. The control signal generator 41 has a second stop face 43 on its end side which points upwards to the stop block 27. The stop face 43 is designed, in terms of its orientation (i.e. extending axially and radially) and also in terms of its dimensions, to interact with the first stop face 29. The outer surface of the control signal generator 41 is provided with toothing, for example splining, by means of which a bushing-shaped control bearing 45 is rotationally fixedly mounted on the control signal generator 41 and is axially displaceable in relation to said control signal generator 41. The bushing-shaped control bearing 45 is provided with appropriate toothing on its inner surface. To ensure clear assembly, one or more teeth may be omitted or a tooth of double or multiple width may be provided.

In a section of its outer surface, the control bearing 45 comprises three recesses running in the circumferential direction and axially offset from each other. Another section of the control bearing 45 comprises a short elevation running in the axial direction. A third section of the control bearing 45 comprises two recesses, again running in the circumferential direction and axially offset from each other. This design of the control bearing 45 serves to ensure defined mounting and rotationally and axially fixed entrainment of a control spring 51. The control spring 51 has a relatively simple shape, is punched out of spring sheet metal, and nearly completely encloses the control bearing 45 in the circumferential direction. On the outward-facing side of the housing 17, the end of the control spring 51 is divided into three control tongues 53 which project with their short (short in relation to the overall length) free end from the control bearing 45, and are otherwise arranged in the three recesses. A short (short in relation to the axial dimension of the control spring) axial depression to receive the elevation of the control bearing is provided in a middle section of the control spring 51. The end of the control spring 51 pointing towards the inward-facing side consists of a bracket-shaped closed section, referred to below as a control bracket 55, which sits in the two recesses, and a single supporting tongue 57 projecting away from the control bearing 45, in order to support the control bearing 45 and the control signal generator 41 on the housing 17.

In the control area, a control bolt 61 is rotatably mounted in the housing 17 and in the cover 19 and is oriented parallel to the bearing axis 37 and to the spindle 25. A radially projecting switching lever 63 is formed on the control bolt 61. A running wheel lever 65 is pivotably connected to the radially projecting switching lever 63. The bearing axis 37 passes through the running wheel lever 65. A pressure spring 69 that is coiled around the control bolt 61 bears upon the switching lever 63 in such a manner that, via the running wheel lever 65, the running wheel 35 is pressed against the lower rail 15. The control bolt 61, at the end face of its end mounted in the housing 17, comprises a profiled control socket 67 which is accessible from the upper side of the memory device 11.

In the load area, three positioning levers, referred to below as locking elements 73, are pivotably mounted above each other on a bearing bolt 71 that is oriented parallel to the spindle 25 and mounted in the housing 17 and the cover 19. The three locking elements 73 each have, at their forward-pointing end, a control finger 75 which on the one side bears against a control tongue 53 and on the other side bears against the control bracket 55 of the control spring 51. On the opposite, rearward-pointing end, the locking elements 73 each have a guide gate 77 which is curved around the bearing bolt 71. The guide gates 77 accommodate a common guide bolt 79. The common guide bolt 79 is arranged parallel to the bearing bolt 71 and is attached to the housing 17. Each locking element 73 has a locking nose 81 which points outwards to the opened side wall of the memory device 11. The locking noses 81 of the individual locking levers 73 are arranged at different radial distances from the bearing bolt 71, with the locking nose 81 of the middle locking element 73 being at the smallest radial distance, and the locking nose 81 of the lowest locking element 73 being at the largest radial distance. The control spring 51 supported by the supporting tongue 57 pretensions the positioning levers 73 in the inward direction so that the locking noses 81 are normally arranged in the interior of the housing 17.

The memory device 11 and the locking device 16 are actuated by a common actuation device 101. The actuation device 101 is located, with limited mobility in the longitudinal direction of the vehicle seat 1, on the first seat rail 13. The actuation device 101 is supported at its rear end on the seat rail 13 by means of a support spring 102 and by means of a support bracket 104. The support spring 102 is designed as a pressure spring. In the present case, the support bracket 104 is fixedly connected to the first seat rail 13 and has a can-shaped receptacle for the support spring 102. The memory device 11 is fastened to the actuation device 101 through suitable openings in the first seat rail 13. The memory device 11 can be actuated by means of the control bolt 61, while the actuation device 101 acts on the locking device 16 by means of a lever arrangement 106.

The actuation device 101 can be actuated on the one hand by means of a longitudinal adjuster triggering lever 110 in order to directly trigger the longitudinal adjuster 3. The triggering lever 110 projects from a horizontally arranged transverse tube 112 that is rotatably mounted on the triggering device 101 and is detachably coupled to the lever arrangement 106. The longitudinal adjuster triggering lever 110 extends as far as the front end of the seat part 4 and is provided there with a handle accessible to the passenger. On the other hand, the actuation device 101 can be actuated by means of a backrest unlocking lever 114 arranged on the outer side of the backrest 5, in order to indirectly trigger the longitudinal adjuster 3, when the backrest 5 is pivoting freely. The backrest unlocking lever 114 acts by means of a cable line 116 on the triggering device 101 in the same way that is described in WO 03/062012 A1 (which corresponds to U.S. Pat. No. 6,799, 800). The locking device 16 on each side of the vehicle seat consists essentially of a multi-toothed locking plate 118 which is connected with the locking device's bolt projecting through the first seat rail 13, and also of a series of stop notches 120 which may be formed as windows or spaces between teeth. Using this locking device 16, which is known per se, locking is performed in small steps of longitudinal seat positions.

In the position of use of the vehicle seat 1, the longitudinal adjuster 3 is locked. Within the memory device 11, the control signal generator 41 is located at the upper end of the spindle 25 and bears with the second stop face 43 against the first stop face 29 of the stop block 27 of the displacement measuring device 21 without, however, the end sides of the control signal generator 41 and of the stop block 27 touching one another. The contact pressure spring 69 presses the running wheel 35 through an opening of the first seat rail 13 into a position in which it bears against the second seat rail 15. This longitudinal seat position which is set is referred to below as the remembered position.

When the backrest 5 is pivoting freely, among other things the longitudinal adjuster 3 is also unlocked on both sides, i.e. in the respective unlocking device 16 the locking plate 118 is forced out of the stop notches 120 (FIG. 7). Because of the pull exerted on the cable line 116 when the backrest 5 is pivoted forwards, the actuation device 101 and the memory device 11 linked with it are additionally pulled backwards from a starting position in the longitudinal direction, thereby tensioning the support spring 102. Because of the small movement of the memory device 11, which corresponds to the attainment of the remembered position as described below, the locking elements 73 at first pivot out, but then pivot in again as forward movement commences (FIG. 8). The first seat rail 13 can now be displaced forward in the longitudinal direction of the vehicle seat 1, relative to the second seat rail 15, on both sides of the vehicle seat 1. Because of the relative displacement between the first seat rail 13 and the second seat rail 15, the wheel 35 runs along the second seat rail 15 as a result of friction. The large gearwheel 31 is rotated by the small gearwheel 39 so that the displacement measuring device 21 is driven. The control signal generator 41, which is held in the circumferential direction by the control spring 51 and the control bearing 45, runs on the spindle 25 and moves within the control bearing 45, linearly guided in a downward direction. The distance covered by the vehicle seat 1 is in direct relation to the displacement of the control signal generator 41 along the displacement measuring device 21 by virtue of the transmission ratio between the two gearwheels 29 and 31 and the geometrical dimensions of the spindle 25. Correspondingly, the length of the spindle 25 is matched to the maximum travel path.

When the vehicle seat 1 is displaced back, the control signal generator 41 moves back again towards the stop block 27. As soon as the second stop face 43 moves into position against the first stop face 29, a control torque is generated which attempts to turn the control signal generator 41 further. The control spring 51, which presses with its control tongues 53 on the control fingers 75 of the locking elements 73, is acted on via the control bearing 45. The pretensioning of the control tongues 53 is very effective in this situation due to the lever arm defined by the short free end of the control tongue 53 projecting from the control bearing 45. The locking elements 73 thus pivot outwards, the pivoting movement of the locking elements 73 being limited by the relative movement of the guide gate 77 and of the guide bolt 79. The locking noses 81 pass through windows in the upper rail 13. The locking nose 81 of at least one locking element 73 moves into a notch 120 in the second seat rail 15, so that this locking action stops the relative movement of the first seat rail 13 with respect to the second seat rail 15 (FIG. 9). The vehicle seat 1 has thus reached its remembered position again. In order for the engaged locking element 73 to become detached again, and in order to resolve those cases in which the locking plate 118 is not exactly aligned on the notches 120 and has to change its position after making initial contact, i.e. in which the locking device 16 can only lock after a delay, the support spring 102 is relaxed when the backrest 5 pivots back again, i.e. when the cable line 116 is not under tension. As a result, the actuation device 101 is moved forward into its starting position. The engaged locking element 73 is released so that, by means of the control bracket 55, the control spring 51 can pivot all the locking elements 73 back into the interior of the housing 17. In addition, the locking plate 118 can engage in the notch 120 (FIG. 10). The longitudinal adjuster 3 is locked so that the vehicle seat 1 is available again for sitting use.

The remembered position can be reset, for example, in the normal longitudinal setting of the vehicle seat 1 or independently thereof, i.e. the memory device 11 can be reset. For this purpose, the control bolt 61 is rotated, as a result of which, by moving the bearing axis 37, the running wheel 35 is lifted off the second seat rail 15, wherein the small gearwheel 39 remains meshed with the large gearwheel 31. The reset spring 33 drives the displacement measuring device 21 so that, if the control signal generator 41 is not yet at the upper end of the spindle 25 it is rotated upwards until the stop faces 29 and 43 bear against one another, but the end sides of the control signal generator 41 and of the bearing block 27 do not. After the control bolt 61 has been released, the contact pressure spring 69 moves the running wheel 35 back onto the second seat rail 15 and holds it there without play. Thus the new remembered position is memorized.

Normally, the backrest 2 is secured in the forward-pivoted position during the "free pivoting" of the backrest, for example by means of a securing pawl in the backrest fitting positively locking the fitting part pivoting together with the backrest 2 to a fitting part that remains immobile during free pivoting of the backrest, as described in DE 102 06 303 A1 (which corresponds to EP 1 334 866 B1), the entire disclosure of which is expressly incorporated herein by reference. In order to cancel this securing of the backrest 2 when the remembered position is reached, the actuation device 101 is complemented by a release device 130. The release device 130 comprises a U-shaped bearing bracket 132 which is attached by means of its central leg to the bearing of the transverse tube 112, which bearing is mounted on the first seat rail 13, and the two free legs project perpendicularly to the longitudinal direction of the vehicle seat 1. The core of a release cable 134, designed as a Bowden cable, is attached to and preferably slotted into the front leg of the bearing bracket 132—or another component connected to the first seat rail 13. The release cable 134 is led to the backrest fitting in order to act on the securing pawl.

A one-armed release lever 136 is arranged in the area of the rear leg of the bearing bracket 132. The lever 136 is pivotably mounted on a fastening bolt 138 which is attached to the memory device 11 and the parts of the actuation device 101 connected thereto, and in the present case is designed as a screw. The sleeve of the release cable 134 is supported on the release lever 136. The support spring 102, which is now designed as a tension spring, is attached and acts between the release lever 136 and the front leg of the bearing bracket 132, whereon the release lever 136 is held in contact with a stop face 140 formed on the rear leg of the bearing bracket 132. The distance of the stop face 140 from the fastening bolt 138 is about half as large as the distance of the support for the sleeve of the release cable 134 from the fastening bolt 138.

When the vehicle seat 1 is displaced back and reaches the remembered position, and the memory device 11 pivots out its locking elements 73, first the memory device 11 and thus the fastening bolt 138 and the parts of the actuation device 101 connected thereto are locked. The first seat rail 13 and thus the bearing bracket 132 can still be displaced slightly further back. The stop face 140 of the rear leg of the bearing bracket 132 bears against the release lever 136, causing it as a result to pivot around the fastening bolt 138. Because of the larger distance to the fastening bolt 138, the support for the sleeve of the release cable 134 moves proportionately a greater amount, so that the sleeve is displaced relative to the core of the release cable 134, this being equal to a pull on the release cable 134. As a result, the securing pawl on the backrest fitting is opened, whereupon the backrest 5 can be pivoted back again.

It will be understood by those skilled in the art that while the present invention has been discussed above with reference to exemplary embodiments, various additions, modifications and changes can be made thereto without departing from the spirit and scope of the invention as set forth in the following claims.

What is claimed is:

1. A longitudinal adjuster that is for a vehicle seat and that is capable of being responsive to predetermined pivoting of the seat's backrest, the longitudinal adjuster comprising:
   a first seat rail;
   a second seat rail that extends in a longitudinal direction, wherein the first seat rail is mounted for moving in the longitudinal direction relative to the second seat rail;
   a locking device for locking the longitudinal adjuster and thereby restricting the first seat rail from moving in the longitudinal direction relative to the second seat rail;
   a memory device mounted for moving in the longitudinal direction with the first seat rail relative to the second seat rail, wherein the memory device interacts with the second seat rail for remembering a longitudinal position of the first seat rail with respect to the second seat rail so that the first seat rail can be moved in the longitudinal direction back to the remembered longitudinal position after the first seat rail has been moved in the longitudinal direction out of the remembered longitudinal position, wherein the first seat rail having been moved in the longitudinal direction out of the remembered longitudinal position is at least partially in response to the predetermined pivoting of the seat's backrest; and
   an actuation device adapted for actuating both
      resetting of the memory device's remembered longitudinal position, and
      the locking device for unlocking the longitudinal adjuster, wherein
   the actuation device includes an adapter and a plurality of components,
   the plurality of components of the actuation device are supported by and movable relative to the adapter of the actuation device,
   the plurality of components of the actuation device includes a pivotable member that is mounted for being pivoted relative to the adapter to actuate the actuation device, and
   the actuation device, as a whole, is mounted for both
      moving in the longitudinal direction with the first seat rail relative to the second seat rail, so that each of the adapter of the actuation device, the plurality of components of the actuation device and the pivotable member of the actuation device is for moving in the longitudinal direction with the first seat rail relative to the second seat rail, and
      being movable in the longitudinal direction relative to the first seat rail, so that the adapter of the actuation device, the plurality of components of the actuation device and the pivotable member of the actuation device are all together movable in the longitudinal direction relative to the first seat rail.

2. The longitudinal adjuster according to claim 1, wherein the actuation device is positioned on the first seat rail.

3. The longitudinal adjuster according to claim 1, wherein the memory device is fastened to the actuation device so that the memory device, as a whole, is for moving in the longitudinal direction with the actuation device relative to the first seat rail.

4. The longitudinal adjuster according to claim 3, further comprising a spring that is operatively connected to the adapter of the actuation device for biasing the actuation device, as a whole, in the longitudinal direction toward a predetermined position, wherein the actuation device, as a whole, being movable in the longitudinal direction relative to the first seat rail comprises the actuation device, as a whole being movable in the longitudinal direction relative to the predetermined position.

5. The longitudinal adjuster according to claim 3, further comprising a cable that is operatively connected to the pivotable member of the actuation device so that a pull on the cable can cause the actuation device, as a whole, to longitudinally move in the longitudinal direction relative to the first seat rail.

6. The longitudinal adjuster according to claim 3, further comprising a cable and a spring, wherein:
   the actuation device, as a whole, being movable in the longitudinal direction relative to the first seat rail comprises the actuation device, as a whole, being movable in the longitudinal direction relative to the first seat rail between a first position and a second position;
   the cable is operatively connected to the pivotable member of the actuation device so that a pull on the cable can cause the actuation device, as a whole, to move in the longitudinal direction relative to the first seat rail from the first position to the second position; and
   the spring is operatively connected to the adapter of the actuation device for moving the actuation device, as a whole, in the longitudinal direction relative to the first seat rail from the second position to the first position.

7. The longitudinal adjuster according to claim 3, wherein the memory device includes at least one pivotable locking element for making locking contact against the second seat rail in response to the first seat rail having been moved in the longitudinal direction back to the remembered longitudinal position.

8. The longitudinal adjuster according to claim 6, wherein the memory device includes at least one pivotable locking element for:
   making locking contact against the second seat rail in response to the first seat rail having been moved in the longitudinal direction back to the remembered longitudinal position, and
   detaching from the second seat rail in response to the actuation device, as a whole, moving in the longitudinal direction relative to the first seat rail from the second position to the first position.

9. The longitudinal adjuster according to claim 3, wherein the memory device includes:
   a displacement measuring device that is rotatable about an axis of rotation and that can be brought into cooperative interaction with the second seat rail; and
   a control signal generator mounted for moving relative to the displacement measuring device, with the moving of the control signal generator relative to the displacement measuring device corresponding to how far the first seat rail has moved in the longitudinal direction relative to the remembered longitudinal position,
   wherein the control signal generator is operative for
      experiencing, at the latest when the first seat rail has been moved in the longitudinal direction back to the remembered longitudinal position, a control torque, and
      then actuating at least one pivotable locking element so that the locking element makes locking contact against the second seat rail, and
   wherein the actuating of the pivotable locking element is by way of a control spring.

10. The longitudinal adjuster according to claim 3 in combination with the vehicle seat having the backrest, wherein:
   the predetermined pivoting comprises pivoting the backrest to a predetermined position;
   a backrest fitting of the backrest secures the backrest in the predetermined position; and
   the combination further comprises a release device for releasing the backrest, so that the backrest can be pivoted out of the predetermined position, in response to relative movement between the actuation device and the first seat rail.

11. The longitudinal adjuster according to claim 1 in combination with the vehicle seat having the backrest.

12. The combination according to claim 11, further comprising a spring and a cable, wherein:
   the predetermined pivoting of the seat's backrest is a first predetermined pivoting of the seat's backrest;
   a second predetermined pivoting of the seat's backrest is in a direction opposite to the first predetermined pivoting of the seat's backrest;
   the actuation device, as a whole, being movable in the longitudinal direction relative to the first seat rail comprises the actuation device, as a whole, being movable in the longitudinal direction relative to the first seat rail between a first position and a second position;
   the spring is operatively connected to the adapter of the actuation device, and the cable is operatively connected between the seat's backrest and the pivotable member of the actuation device, so that
      (a) the first predetermined pivoting of the seat's backrest causes the actuation device, as a whole, to move in the longitudinal direction relative to the first seat rail from the first position to the second position, and
      (b) a second predetermined pivoting the seat's backrest results in the actuation device, as a whole, moving in the longitudinal direction relative to the first seat rail from the second position to the first position; and
   the actuation device, as a whole, moving in the longitudinal direction relative to the first seat rail from the second position to the first position is at least partially caused by the spring.

13. The longitudinal adjuster according to claim 4, wherein the memory device includes:
   a displacement measuring device that is rotatable about an axis of rotation and that can be brought into cooperative interaction with the second seat rail; and
   a control signal generator mounted for moving relative to the displacement measuring device, with the moving of the control signal generator relative to the displacement measuring device corresponding to how far the first seat rail has moved in the longitudinal direction relative to the remembered longitudinal position,
   wherein the control signal generator is operative for
      experiencing, at the latest when the first seat rail has been moved in the longitudinal direction back to the remembered longitudinal position, a control torque, and
      then actuating at least one pivotable locking element so that the locking element makes locking contact against the second seat rail, and
   wherein the actuating of the pivotable locking element is by way of a control spring.

14. The longitudinal adjuster according to claim 5, wherein the memory device includes:
   a displacement measuring device that is rotatable about an axis of rotation and that can be brought into cooperative interaction with the second seat rail; and
   a control signal generator mounted for moving relative to the displacement measuring device, with the moving of the control signal generator relative to the displacement measuring device corresponding to how far the first seat rail has moved in the longitudinal direction relative to the remembered longitudinal position,
   wherein the control signal generator is operative for
      experiencing, at the latest when the first seat rail has been moved in the longitudinal direction back to the remembered longitudinal position, a control torque, and
      then actuating at least one pivotable locking element so that the locking element makes locking contact against the second seat rail, and
   wherein the actuating of the pivotable locking element is by way of a control spring.

15. The longitudinal adjuster according to claim 6, wherein the memory device includes:
   a displacement measuring device that is rotatable about an axis of rotation and that can be brought into cooperative interaction with the second seat rail; and
   a control signal generator mounted for moving relative to the displacement measuring device, with the moving of the control signal generator relative to the displacement measuring device corresponding to how far the first seat rail has moved in the longitudinal direction relative to the remembered longitudinal position,
   wherein the control signal generator is operative for experiencing, at the latest when the first seat rail has been moved in the longitudinal direction back to the remembered longitudinal position, a control torque, and then actuating at least one pivotable locking element so that the locking element makes locking contact against the second seat rail, and wherein the actuating of the pivotable locking element is by way of a control spring.

16. The longitudinal adjuster according to claim 11, wherein the memory device includes:

a displacement measuring device that is rotatable about an axis of rotation and that can be brought into cooperative interaction with the second seat rail; and a control signal generator mounted for moving relative to the displacement measuring device, with the moving of the control signal generator relative to the displacement measuring device corresponding to how far the first seat rail has moved in the longitudinal direction relative to the remembered longitudinal position, wherein the control signal generator is operative for experiencing, at the latest when the first seat rail has been moved in the longitudinal direction back to the remembered longitudinal position, a control torque, and then actuating at least one pivotable locking element so that the locking element makes locking contact against the second seat rail, and wherein the actuating of the pivotable locking element is by way of a control spring.

17. The longitudinal adjuster according to claim 3, comprising:

a support bracket fixedly connected to the first seat rail, and a support spring that is operatively connected to both the support bracket and the adapter of the actuation device for urging the actuation device, as a whole, to move in the longitudinal direction relative to the first seat rail.

18. The longitudinal adjuster according to claim 17, wherein the support spring is positioned between the support bracket and the actuation device.

19. The longitudinal adjuster according to claim 1, wherein the actuation device, as a whole, being mounted for being movable in the longitudinal direction relative to the first seat rail comprises:

the actuation device, as a whole, being mounted for being movable in the longitudinal direction, to a limited extent, relative to the first seat rail.

20. The longitudinal adjuster according to claim 19, wherein the memory device is fastened to the actuation device for moving in the longitudinal direction with the actuation device relative to the first seat rail, whereby the memory device is movable in the longitudinal direction, to the limited extent, relative to the first seat rail.

21. The longitudinal adjuster according to claim 20, further comprising a cable and a spring, wherein:

the actuation device, as a whole, being movable in the longitudinal direction relative to the first seat rail comprises the actuation device, as a whole, being movable in the longitudinal direction relative to the first seat rail between a first position and a second position;

the cable is operatively connected to the pivotable member of the actuation device so that a pull on the cable can cause the actuation device, as a whole, to move in the longitudinal direction relative to the first seat rail from the first position to the second position; and the spring is operatively connected to the adapter of the actuation device for moving the actuation device, as a whole, in the longitudinal direction relative to the first seat rail from the second position to the first position.

22. The longitudinal adjuster according to claim 21, wherein the memory device includes at least one pivotable locking element for:

making locking contact against the second seat rail in response to the first seat rail having been moved in the longitudinal direction back to the remembered longitudinal position, and detaching from the second seat rail in response to the actuation device, as a whole, moving in the longitudinal direction relative to the first seat rail from the second position to the first position.

23. The longitudinal adjuster according to claim 20, wherein the memory device includes:

a displacement measuring device that is rotatable about an axis of rotation and that can be brought into cooperative interaction with the second seat rail; and a control signal generator mounted for moving relative to the displacement measuring device, with the moving of the control signal generator relative to the displacement measuring device corresponding to how far the first seat rail has moved in the longitudinal direction relative to the remembered longitudinal position, wherein the control signal generator is operative for experiencing, at the latest when the first seat rail has been moved in the longitudinal direction back to the remembered longitudinal position, a control torque, and then actuating at least one pivotable locking element so that the locking element makes locking contact against the second seat rail, and wherein the actuating of the pivotable locking element is by way of a control spring.

24. The longitudinal adjuster according to claim 1, wherein the pivotable member of the actuation device is for actuating the actuation device so that the longitudinal adjuster is unlocked without resetting the memory device's remembered longitudinal position.

25. A longitudinal adjuster that is for a vehicle seat and that is capable of being responsive to predetermined pivoting of the seat's backrest, the longitudinal adjuster comprising:

a first seat rail;

a second seat rail that extends in a longitudinal direction, wherein the first seat rail is mounted for moving in the longitudinal direction relative to the second seat rail;

a locking device for locking the longitudinal adjuster and thereby restricting the first seat rail from moving in the longitudinal direction relative to the second seat rail;

a memory device, wherein the memory device, as a whole, is mounted for both moving in the longitudinal direction with the first seat rail relative to the second seat rail, and being movable in the longitudinal direction relative to the first seat rail, the memory device interacts with the second seat rail for remembering a longitudinal position of the first seat rail with respect to the second seat rail so that the first seat rail can be moved in the longitudinal direction back to the remembered longitudinal position after the first seat rail has been moved in the longitudinal direction out of the remembered longitudinal position, and the first seat rail having been moved in the longitudinal direction out of the remembered longitudinal position is at least partially in response to the predetermined pivoting of the seat's backrest; and an actuation device adapted for actuating both resetting of the memory device's remembered longitudinal position, and the locking device for unlocking the longitudinal adjuster, wherein the actuation device includes an adapter and a plurality of components, the plurality of components of the actuation device are supported by and movable relative to the adapter of the actuation device, the plurality of components of the actuation device includes a pivotable member that is mounted for being pivoted relative to the adapter to actuate the actuation device, the actuation device, as a whole, is mounted for both moving in the longitudinal direction with the first seat rail relative to the second seat rail, so that each of the adapter of the actuation device, the plurality of components of the actuation device and the pivotable member of the actuation device is for moving in the longitudinal direction with the first seat rail relative to the second seat rail, and being movable in the longitudinal direction relative to the first seat rail, so that the adapter of the actuation device, the plurality of components of the actuation device and the pivotable member of the actuation device are all together movable in the longitudinal direction relative to the first seat rail, and the adapter of the actuation device is fastened to the memory device so that the memory device, as a whole, and the actuation device, as a whole, are together movable in the longitudinal direction relative to the first seat rail.

26. The longitudinal adjuster according to claim 25, wherein:

the actuation device, as a whole, being movable in the longitudinal direction relative to the first seat rail comprises the actuation device, as a whole, being movable in the longitudinal direction, to a limited extent, relative to the first seat rail, and the memory device, as a whole, being movable in the longitudinal direction relative to the first seat rail comprises the memory device, as a whole, being movable in the longitudinal direction, to a limited extent, relative to the first seat rail.

\* \* \* \* \*